Oct. 3, 1961  H. M. GIEPEN  3,002,602
VENDING APPARATUS
Filed Sept. 26, 1955  9 Sheets-Sheet 1

Fig. 1

Inventor
Hubert M. Giepen
by Roberts, Cushman & Grover,
Attys.

Inventor
Hubert M. Giepen
by Roberts, Cushman & Grover
Attys

Oct. 3, 1961    H. M. GIEPEN    3,002,602
VENDING APPARATUS
Filed Sept. 26, 1955    9 Sheets-Sheet 9

Inventor
Hubert M. Giepen
by Roberts, Cushman & Grover
Att'ys.

United States Patent Office 3,002,602
Patented Oct. 3, 1961

3,002,602
VENDING APPARATUS
Hubert M. Giepen, 482 Jerusalem Road, Cohasset, Mass.
Filed Sept. 26, 1955, Ser. No. 536,520
2 Claims. (Cl. 194—10)

The present invention relates to vending machines of the type which permit purchase of a variety of articles selling at different prices, with any combination of coins.

One of the main objects of the invention is to provide a vending machine of the above type which is very compact and simple in operation and nevertheless permits the sale of a comparatively great number of goods at various prices, delivering each selected article at one and the same point of the machine, and continuously indicating the amount of money paid in as well as any articles which might be sold out.

Other objects are to provide a device of the above indicated type which permits the storage of a large number of articles to be sold in a minimum of space, to provide such a machine which has a single delivering station and delivers the goods at that station with a minimum travel of the goods and of moving parts generally, to provide for the delivery of two or more articles upon a single selection, to provide a reliable test for, and indication of any article that might be sold out, and to provide for easy reloading of the machine with articles to be sold.

Subsidiary objects are to provide a device, especially suitable for machines of this type, which selects the nearest route of a selected portion, such as a bin, of a conveyor device to a delivery station, to provide for the currently instantaneous indication of the total amount paid in for a given sale, to provide such a paid-in price indicator which is correlated with means for delivering articles selling at a price that has actually been paid-in, to provide means for holding in escrow the paid-in price until either an article is selected or return of the paid-in amount is demanded, to provide a rugged and reliable sequence control for carrying out a number of operations required for a sale transaction, to provide a compact arrangement clearly laid out for easily comprehensible selection of an article to be purchased from those which are not sold out, to provide an arrangement for delivery of goods in movable bins to, selection at and delivery from, a single station, to provide selective driving means for carrying out the goods conveying operation in a simple and reliable manner, to provide, in conjunction with such goods conveying and station means, means for testing the presence or absence of goods to be sold, to provide, for purposes of devices of this general type, a particularly compact and practical means for moving goods from a storage to a delivering container, and a particularly effective spatial correlation of goods, storage and conveying means, goods discharging means and goods delivery means.

A brief summary of this invention in various aspects, indicating its nature and substance for attaining the above objects, is as follows.

The vending apparatus according to the invention, considered in its entirety, comprises conveyor means with a series of storage means mounted thereon, such as a conveyor belt carrying storage bins, a discharge station means arranged adjacent to the conveyor means, means for preselecting a storage means, and means for driving the conveyor means to bring a predetermined storage means in the shortest time to the station means, the discharge station means includes elevator means on one side of a goods storing means or bin that has been carried by the conveyor means to the station, ejector means for moving an article from the bin to a receiving and delivering station conveyor such as an elevator, and discharge means for transporting an article from a delivering position of the station conveyor; in a preferred embodiment the station conveyor transports the goods from one side to the other side of the storage means on the conveyor means; the conveyor driving means includes, in a preferred embodiment, a selector switch that is kinematically coupled to the conveyor means, correlated with the preselecting means, and which is inherently always in a position to energize the driving means in a sense that brings the preselected storage means in the shortest route to the station means; the preselecting means include provisions for counting and indicating money paid-in, for indicating goods sold out, and escrow means for storing money until a selection is actually made or for returning money on demand before a sale is transacted.

Other objects and aspects of novelty in addition to those contained in the above summary of the nature and the objects of the invention will appear from the herein presented outline of its principles, its mode of operation and its practical possibilities together with a detailed description of a practical embodiment illustrating its novel characteristics. These refer to drawings in which.

Figure 1:
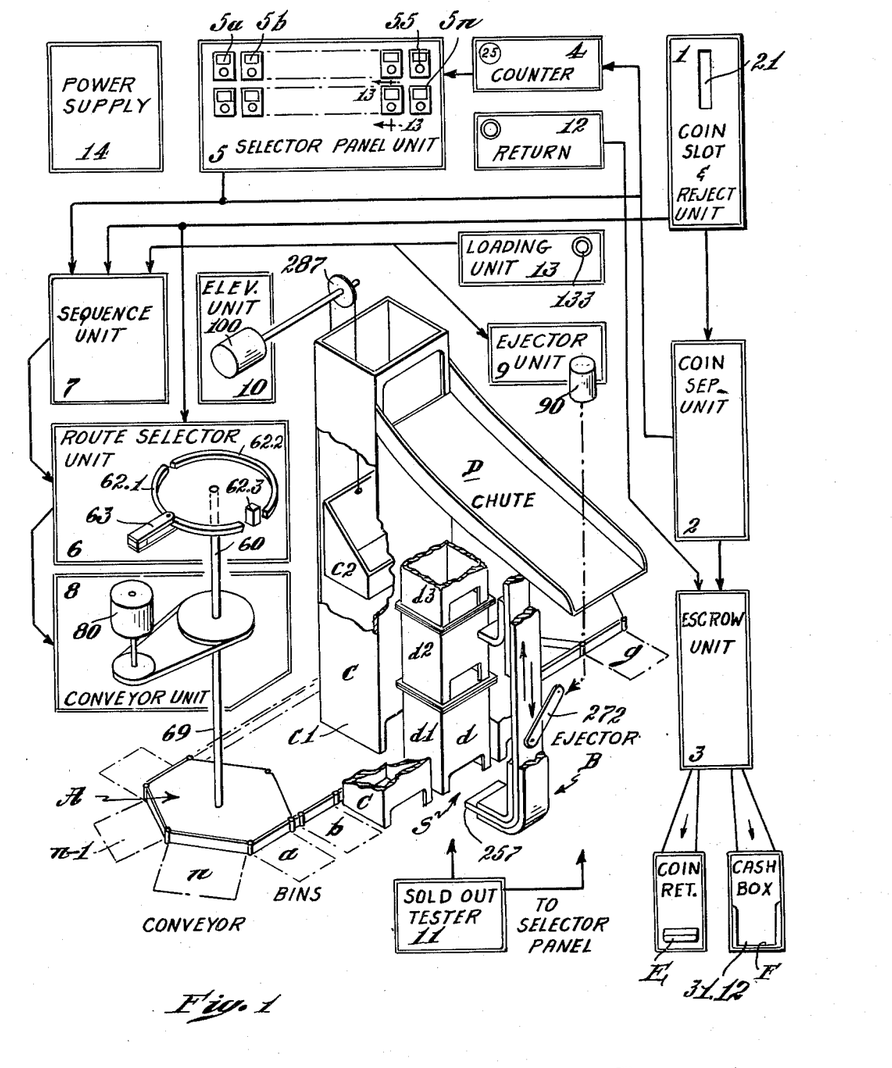
FIG. 1 is a schematical showing of the vending apparatus in its entirety.

The following description of a typical embodiment of the invention, including components which are particularly suited for purposes of the invention but have also more general uses, will first present an outline of the entire apparatus with reference to FIG. 1, then a detail description of the electric devices and circuitry (subdivided, with the related mechanical components, into several units) which are employed in the apparatus, will then proceed to describe in detail the construction of its mechanical components, and will finally present its operation.

Outline of the apparatus

As indicated in FIG. 1, a conveyor A carries a plurality of storage bins $a$, $b$, $c$, ... $n$, each of which can have several stories, such as indicated at $d1$, $d2$, $d3$ of bin $d$. This conveyor is driven and stopped at a selected station by means of a conveyor unit indicated at 8 of FIG. 1 as well as of FIG. 2; the details of this conveyor unit will be explained more in detail hereinbelow with reference to FIGS. 2, 5 to 7.

Figure 2:
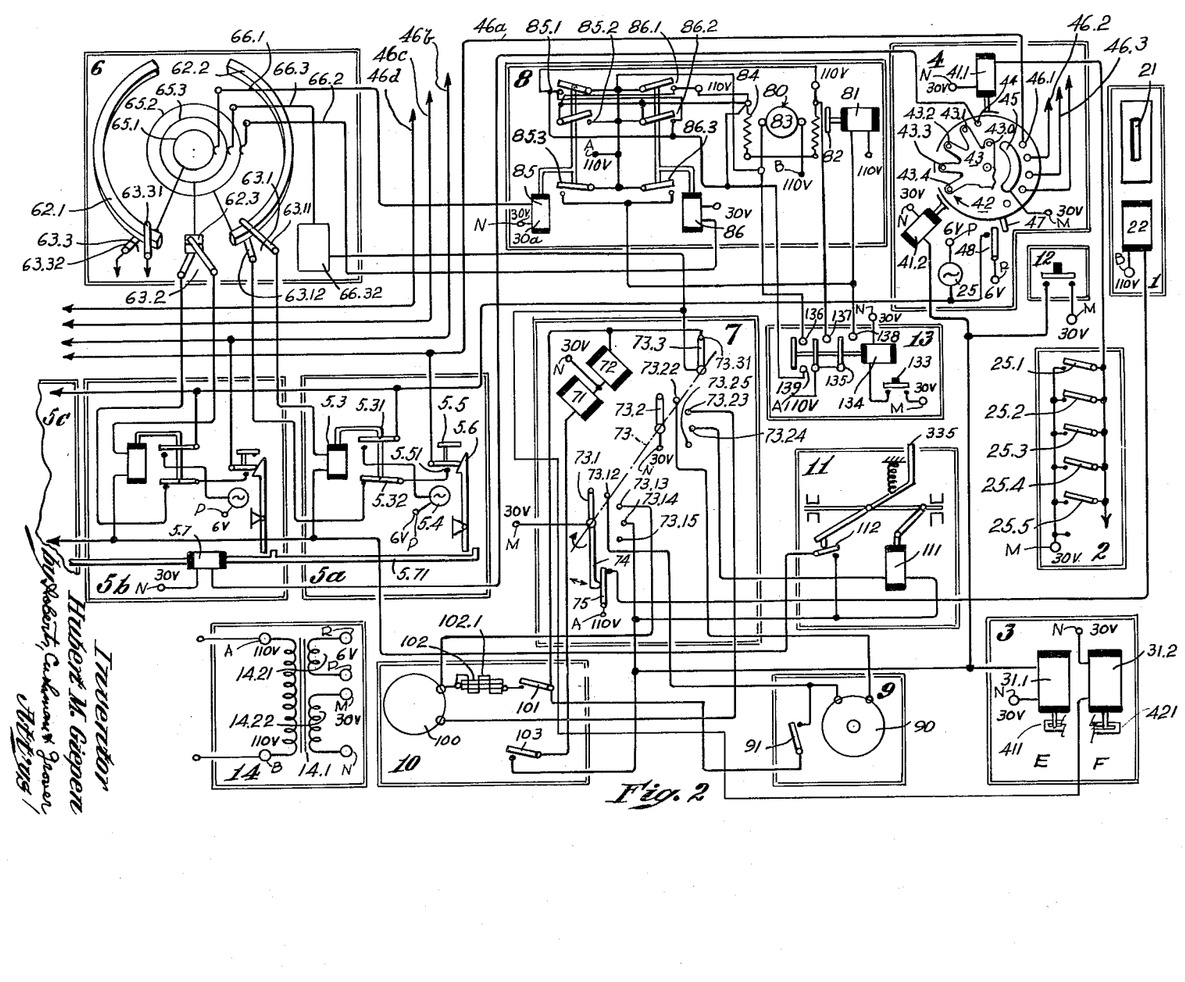
FIG. 2 is an electric circuit diagram which includes and is by corresponding identification marks correlated to the respective components of FIG. 1.

The conveyor A is mechanically coupled with a route selector unit 6, whose principal portion is the selector switch that is schematically indicated in FIGS. 1 and 2 and which will be described in detail with reference to FIGS. 17 to 19. On the outside of the conveyor is an an ejector device B, controlled by the ejector unit 9 which will be described in detail with reference to FIGS. 2, and 10 to 12. On the other side of the conveyor opposite the ejector B is an elevator C comprising a shaft C1 and a skip bucket C2, controlled and driven by means of the elevator unit 10. The elevator discharges into a chute D which brings the goods forward towards the ejector side of the conveyor. These will be described with reference to FIGS. 2, and 5 to 9. Ejector, elevator and discharge chute together define a station S.

These goods handling components of the apparatus are operated by the following control units, all indicated in FIGS. 1 and 2.

Coins of any desirable denomination are inserted in a coin slot and reject unit 1 of conventional design, from where they pass into a coin separating unit 2 likewise of conventional design. From there the coins pass into an escrow unit according to the present invention, indicated at 3 of FIGS. 1 and 2 and described in detail with reference to FIGS. 21 to 25. This escrow unit delivers the coins either in the cash box F or into the coin return slot E, upon operation of the selector panel 5 or the return button 12 respectively.

The coin separator unit 2 activates the counter unit 4 which in turn presets the selector panel unit 5. The counter unit 4 indicates the money paid in and, if the selector panel unit is operated by pressing a button indicating an article selling at the price of or below the amount paid in and indicated at counter unit, activates the route selector unit 6 and the sequence unit 7.

The route selector unit 6 sends the bin with the selected article on the shortest route to the station, by means of the conveyor unit 8.

The sequence unit 7 operates the ejector unit 9 with ejector B, and the elevator unit 10 with elevator C.

A sold-out tester unit 11 checks each bin when located at the stations and actuates the sold-out indicators on selector panel unit 5.

The return unit 12 returns coins paid in, if it is desired not to complete the sale, and the loading unit 13 permits step by step movement of the conveyor with the bins for reloading the latter. A power supply unit is indicated at 14.

The electric circuit

FIG. 2 shows the units 1 to 14 in detail, as follows, reference being also made, wherever it might assist in a better understanding of the mechanical components that are schematically indicated in the circuit diagram of Fig. 2, to Fig. 1 and to figures depicting such mechanical components, in anticipation of the subsequent more detailed description referring to these figures.

Figure 3:
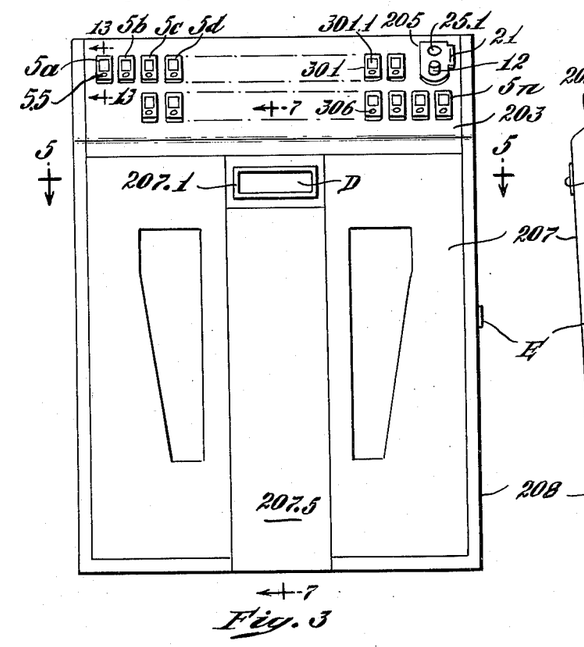
FIG. 3 is a front elevation of the practical embodiment of the invention herein to be described.

The coin slot and reject unit 1 is mounted on a conveniently accessible part of the housing of the apparatus, as indicated in FIGS. 2, 3 by coin slot 21 which is actually mounted on the inclined front panel 203 of the device, as will be described with reference to FIGS. 3 and 4. This unit also comprises a slug rejector cut-off coil 22, energized by a normally closed switch 75 of the sequence control unit 7, which switch opens when the unit 7 begins to operate.

For purposes of efficient design, three different voltages are used in the circuitry of the herein described embodiment of the apparatus according to the invention. These are derived from the power supply unit 14 to be described below. In order to simplify the circuit diagram of FIG. 2, the connections to the terminals of power unit 14 are not drawn in, but are indicated by terminals with the legends 6 v., 30 v., and 110 v., from which wires are assumed to lead to the similarly marked terminals of unit 14 in order to complete the respective circuits in appropriate manner which needs no further explanation. Thus, the series connection of normally closed switch 75 and of slug rejector cut-off coil 22, to the 110 volt terminals is indicated by the legends 110 v. at one terminal each of switch 75 and of coil 22.

The coin separator unit 2 comprises in conventional manner a group of coin switches 25.1, 25.2, 25.3, 25.4, etc. connected in parallel and mounted in the coin track, which group is connected in series to the stepper coil 41.1 of the counter unit 4. In conventional manner, these switches are closed upon passage of selectively effective coins. For example, a five cent piece passing through this switch arrangement closes one of the switches thus delivering one energy impulse to the stepper solenoid 41.1 of unit 4, a ten cent piece consecutively energizes two switches thus causing the stepper 41.1 to operate two times, and a twenty-five cent piece closes all five switches, one after the other, thus sending five impulses to the stepper coil 41.1. The operation of this combination of a conventional coin separator with the counter of unit 4, according to the invention, will be described in detail hereinbelow.

Figure 20:
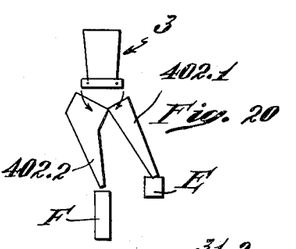
FIG. 20 is a diagram of the escrow unit with cash box and return slot.
Figure 21:
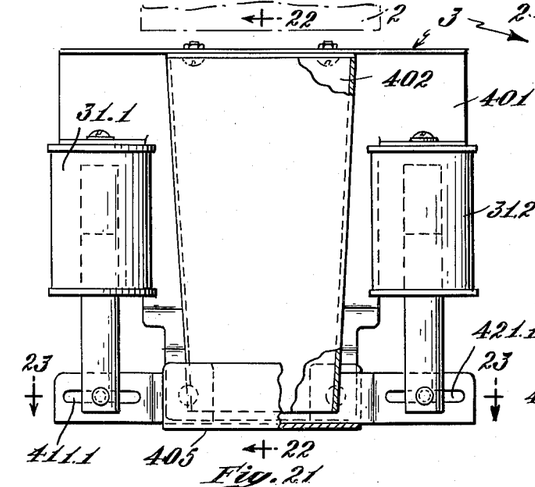
FIG. 21 is a front elevation of the escrow unit indicated in FIGS. 1 and 2.
Figure 22:
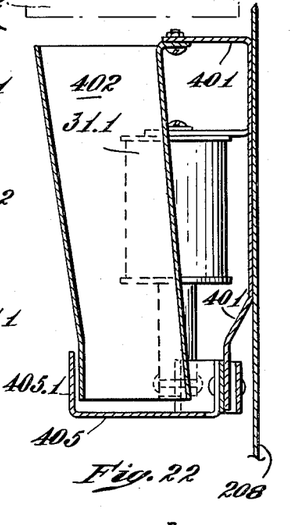
FIGS. 22 and 23 are sections on lines 22—22 and 23—23 respectively of FIG. 21.
Figure 23:
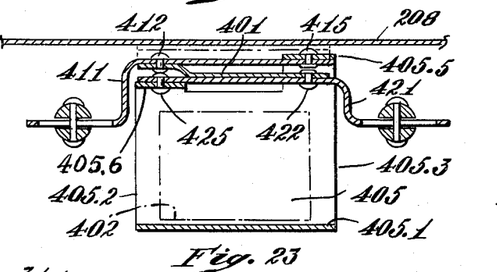

The escrow unit 3 comprises two solenoids, a coin return coil 31.1, and a cash box coil 31.2 which solenoids operate a mechanism to be described below in detail with references to FIGS. 21 to 25 which show these solenoids 31.1 and 31.2. FIG. 20 indicates the function of the solenoids, namely the coin discharge either into a return opening E shown in FIGS. 1 and 2 and also indicated in FIGS. 3 and 4, or into a cash box F, also indicated in FIG. 6.

The escrow unit 3 is electrically connected to the reset coil 41.2 of the counter unit 4 and, through the elevator unit 10, to the coils 71 and 72 of the sequence unit 7, in the manner to be described below.

The coil return solenoid 31.1 can be independently energized by pressing the push button switch of the return unit 12. This push button is also indicated at block 12 of FIG. 1 and at 12 of FIGS. 3 and 4.

The counter unit 4 has the above mentioned stepper coil 41.1, a reset coil 41.2, and a conventional stepping device actuated by these two coils, as schematically indicated by a rotating disk 42 which is advanced one step in the direction of the arrow every time the stepper coil 41.1 receives an energy impulse from the unit 2. The disk 42 carries a multiple contact piece 43 which has a preliminary contact 43.0 and a series of counting contacts 43.1, 43.2, etc. whose identification numbers correspond to the number of monetary units which they indicate, here for example units of five cents. The counter unit 4 has furthermore a fixed selector contact 44, and a fixed slide contact 45 (on a 30 v. terminal) which is arranged to contact with the rotary contact 43.0. A series of fixed selector contacts 46.1, 46.2, etc. correspond, as distinct from the reset coil contact 44, to the selector contacts 43.1, etc.

The stepper and counting disk 42 further carries a pin or cam 47 for closing the normally open switch 48 upon the first step being performed. The angular distances between the movable counter contacts 43.1, 43.2, etc. and between the stationary counter contacts 46.1, 46.2, etc. are the same, and the angular distance between the rotary contact 43.1 in normal position and the first stationary contact 46.1 is five times the aforementioned distance between the individual counter contacts. The preliminary switch 43.0 contacts the segment 45 after the first step and remains there during the entire stepping action. As mentioned above, the normally open switch 48 for energizing the counter lamp 25 and the selector panel units 5 is closed by the pin 47 upon the first step being performed and remains closed until the rotary contacts return to normal position.

The counter unit 4 is thus associated with a counter light 25 which was mentioned above with reference to FIG. 1, and which is also indicated in FIG. 3 by its window 25.1 which is mounted on the inclined front panel 203 of the machine. This lamp 25 illuminates a transparency which can be attached to the disk 42 or geared thereto, and which inserts between the lamp 25 and the window 25.1 numbers indicating the amount paid in, in the manner to be described hereinbelow.

Each one of the stationary contacts 46.1 etc. is connected with a separate wire, 46a, 46b, 46c, etc. to a respective one of the selector panel units 5, 5a, 5b, 5c, etc. Only one of these is fully shown, namely that between contact 46.1 and unit 5a. FIG. 2 shows only two selector panel units, namely 5a and 5b, it being understood that wires 46c, 46d, etc. lead to similar units 5c, 5d, etc., depending on the number of articles at different prices the machine is able to vend. The wire 46 that corresponds to a given paid-in amount is connected to all panel units for selecting articles selling at that price. Thus, in the present example, panel unit 5a would sell an article costing 25 cents, and panel 5b an article costing 30 cents.

The counter unit has further an electrical connection, parallel to the lamp 25, to the sold-out relay mechanisms of panel units 5, and from contact 44 to the reset coils 5.7 of the panel units 5 for purposes to be described hereinbelow. As mentioned above, an electrical connection leads from reset coil 41.2 to the escrow unit 3.

The selector panel units 5, one of which is provided for each bin containing the articles that can be sold, are constructed as follows.

Each panel has the above mentioned sold-out relay 5.3 that operates a normally open contact 5.31 and normally closed contact 5.32. The solenoid 5.3 is energized from the route selector unit 6 and the switch 112 of the sold-out tester 11. The switch 5.31 when closed, lights the sold-out lamp 5.4. The switch 5.32 opens upon energization of the coil 5.3, opening a circuit leading through selector switch 5.51 from route selector unit 6 to the counter-unit 4. The normally open switch 5.51 is operated by the selector unit button or frame 5.5 also shown in FIGS. 1 and 3 and represented in FIG. 13 by frame 301 and prong 303.1. The push buttons 5.5 upon having been depressed are held closed by a latch device 5.6 which is released only upon energization of the above mentioned reset coil 5.7 which is common for all selector panels, or one of which can be provided for any group of panel units 5. A practical latching device of this type will be described with reference to FIGS. 13 to 15.

Figure 17:
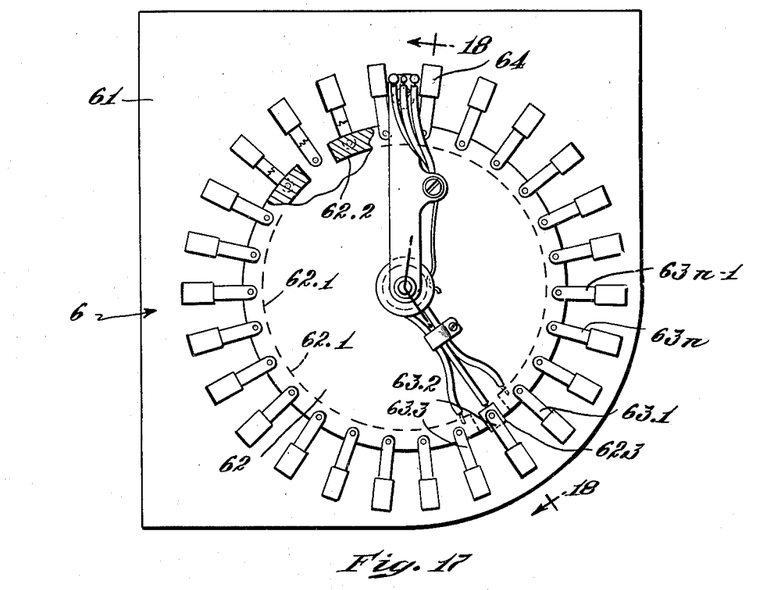
FIG. 17 is a plan view of the route selector switch according to the invention also shown in FIG. 5.
Figures 18, 19:
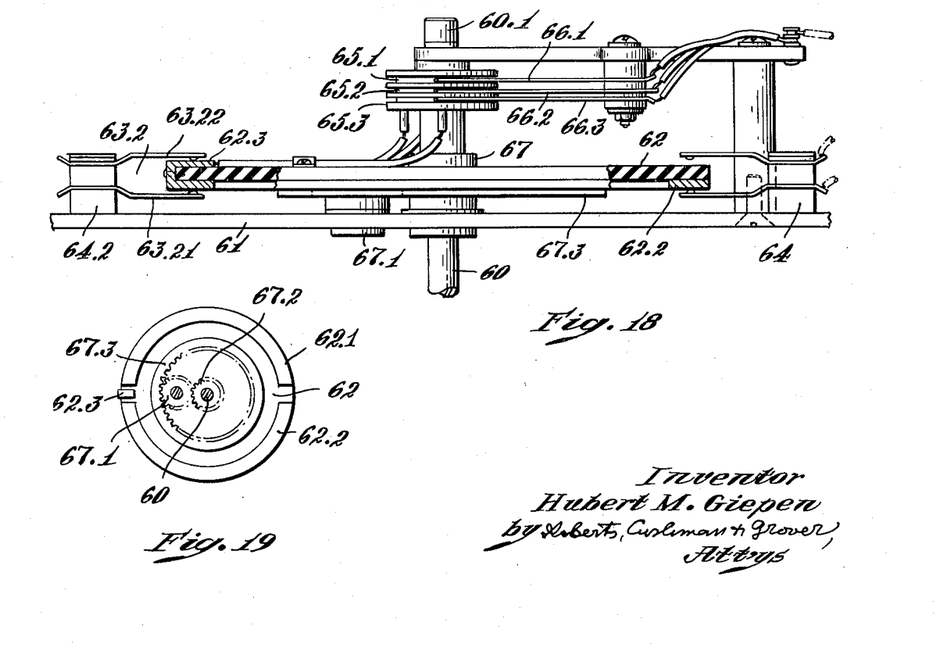
FIG. 18 is a section on lines 18—18 of FIG. 17.
FIG. 19 is a bottom view of the drive that connects the conveyor with the route switch.

The route selector unit 6 which is shown at 6 of FIG. 2, and in detail also in FIGS. 17 to 19, is constructed as follows.

As shown in FIGS. 1, 5, 6 and 18, a shaft 60 is rotatably mounted on a suitable supporting plate 61 and carries a circular disk 62 of insulating material. The disk 62 has fastened to one side thereof two approximately semi-circular sliding contact segments 62.1 and 62.2 which are separated by two gaps as clearly shown in FIGS. 1, 2 and 17. One gap is left open, whereas the other gap contains a contact pad 62.3 which, as shown in FIG. 18 extends on both sides of the disk 62 but is separated from segments 62.1 and 62.2. Mounted around the disk 62 are a series of contact spring pairs 63.1, 63.2, 63.3, etc., one pair for each control panel unit 5a, 5b, 5c, etc. These spring contacts are mounted on blocks 64 and are so constructed that the lower spring of the pair such as 63.21 of FIG. 18 touches the semi-circular contact segment 62.1 or 62.2 or the pad 62.3 opposite which it might be located, whereas the upper contact spring such as 63.22 of FIG. 18 only reaches the upper surface of the pad 62.3 upon reaching that pad.

As shown in FIGS. 2, 17 and 18, the contact segments 62.1, 62.2 and the pad 62.3 are electrically connected to three strip rings 65.1, 65.2 and 65.3 respectively which are mounted on the shaft 60 and insulated therefrom. These slide rings contact with brushes 66.1, 66.2 and 66.3 which, as indicated in FIGS. 17 and 18, lead to suitable terminals which are in turn connected to wires leading, in the manner indicated in FIG. 2, to the sequence unit 7 and to the conveyor unit 8. A time delay relay 66.32 is inserted in the lead from the slide contact 66.3 and the pad 62.3. From each pair of contacts 63, two wires lead to the sold-out relay coil 5.3 of a respective panel unit 5 and to the switch 5.32 of that coil respectively. Thus, the upper contact 63.22 of FIG. 18 is for example connected to the solenoid 5.3 of panel unit 5b, and the lower contact 63.21 is connected to the switch 5.32 of the same panel unit 5b, and it will be noted that in FIGS. 17, 18 and 2, the contacts 63.2 happen to be in electrical contact with the pad 62.3. The contacts 63.3 of course lead to a panel unit 5c which is not shown in FIG. 2.

Figure 6:
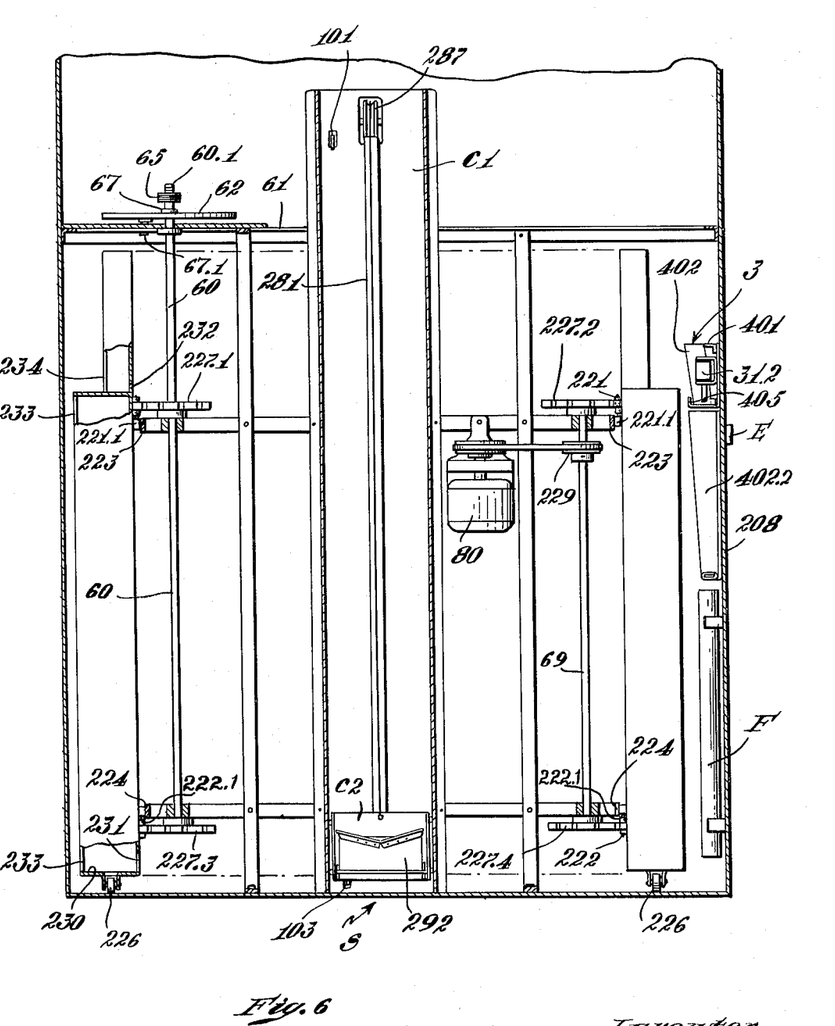
FIG. 6 is a section on lines 6—6 of FIG. 4.

As indicated in FIGS. 1, 6 and 19, the disk 62 is driven, from shaft 60 that comes from the conveyor unit 8 in such a manner that each position of one of the bin units a, b, c, etc. relatively to the station S corresponds to a position, relatively to the switches 63.2, of the disk 62. Since the conveyor moves at a different, usually considerably higher, speed than the disk 62 of the route selector unit 6, a suitable gear 67 is interposed between the conveyor unit shaft 60 and the switch shaft 60.1. For the sake of simplicity, this gear link is not shown in FIGS. 1 and 2, but in FIG. 19, as inserted between the conveyor unit shaft 60 and the route selector shaft 60.1. As shown in FIGS. 18 and 19, the shaft 60 drives a gear wheel 67.2 which by way of a planet gear 67.1 drives an internally geared wheel 67.3 which is fastened to the switch shaft 60.1.

The route selector unit 6 predetermines, for any bin that is selected by means of a push button 5.5 of a panel unit 5a, 5b, 5c, etc. the route, in one direction or the other depending which is shorter, to the station S in the manner to be described in detail hereinbelow. As will be apparent, the number of route selector contact pairs 63, of counter contacts 43 (unit 4) and of bins a, b, c, etc., is the same. It will be evident that a comparatively large number of contact positions can be provided some of which can remain empty if all bin positions of the conveyor are not utilized.

The sequence unit 7 has a stepping coil 72 and a reset coil 71 which control in conventional manner a rotary switch arrangement mounted on a common shaft which is indicated at 73. The shaft 73 carries, fixed thereto, three rotating arms 73.1, 73.2 and 73.3. Each of these arms is constructed to make consecutive contact with fixed contact points 73.12, 73.13, 73.14 for rotating arm 73.1, with fixed contact points 73.22, 73.23 and 73.24 for rotating arm 73.2, and with fixed contact point 73.31 for rotating arm 73.3. It will be noted from FIG. 2 that contact point 73.31 is angularly in advance of the contact points 73.12 and 73.22, that points 73.13 and 73.23 are in third position and that contact points 73.14 and 73.24 in fourth position.

The shaft 73 carries further an arm 74 which opens the above mentioned switch 75, normally closed, when the rotary selector switch begins to operate and which remains open until 73 returns to normal position.

The various stationary contact points of unit 7 are electrically connected to the operating units 8, 9, 10 and 11 in the manner schematically indicated in FIG. 1 shown in detail in FIG. 2 and to be described in detail hereinbelow.

The stepping coil 72 advances the shaft 73 with its arms 73.1, 73.2 and 73.3 one step upon receiving one energy impulse and the reset coil 71 brings the stepper into normal position upon energization.

The conveyor unit 8 has mainly the purpose of controlling the conveyor motor 80 which, as indicated in FIG. 1 drives the conveyor unit A by means of one of its shafts such as 60.

The motor 80 is in conventional manner equipped with an electrical brake solenoid 81 which is normally de-energized and in that condition arrests the motor by suitable means such as a friction disk 82.

The motor armature 83 as well as its field 84 and the brake solenoid 81 are controlled by two relays of unit 8 which are actuated by solenoids 85 and 86. Each relay has three normally open switches 85.1, 85.2 and 85.3 and 86.1, 86.2, 86.3 respectively.

The solenoids 85 and 86 are connected to the brushes 65.1 and 65.2 of the route selector unit 6 as indicated in FIG. 2 and their switches release the brake and energize the motor 80 for rotation in one or the other direction as mentioned above, dependent upon the position of the selector switch which will always drive the motor in the direction that brings a selected bin to the station via the shorter route. Assuming for example that the relay magnet 86 is energized, by way of route selector unit 6 and wire 66.2 in the manner to be described hereinbelow, the contacts 86.1, 86.2 and 86.3 will be closed. The closing of switch 86.3 energizes the brake relay 81 and releases the brake, while switches 86.1 and 86.2 upon closing energize the motor for rotation of the conveyor in the selected sense. After the conveyor reaches the predetermined destination, the route selector unit sends an impulse to the stepping coil 72 of sequence unit 7 for purpose to be described below. On the other hand, energization of coil 85 again releases the brake but starts the motor in the other direction, and likewise energizes, upon reaching its destination, the stepping coil 72 of unit 7. The brake 82 operated by solenoid 81 can for example be a friction disk which presses against a rotating member of the motor. The motor continues to run and to drive the conveyor unit, advancing the selected bin toward the station, until the pad 62.3 of the route selector 6 reaches the contact pair 63 which corresponds to the selected bin, for example as indicated in FIG. 2 for contact pair 63.2 where the conveyor unit coil 86 or 85 is de-energized when the contact 63.12 leaves segment 62.2 which stops the motor, applies the brake and resets all contacts to normal position. This operation will be described in detail hereinbelow, in cojunction with that of the correlated control units.

Figures 7, 8, 9:
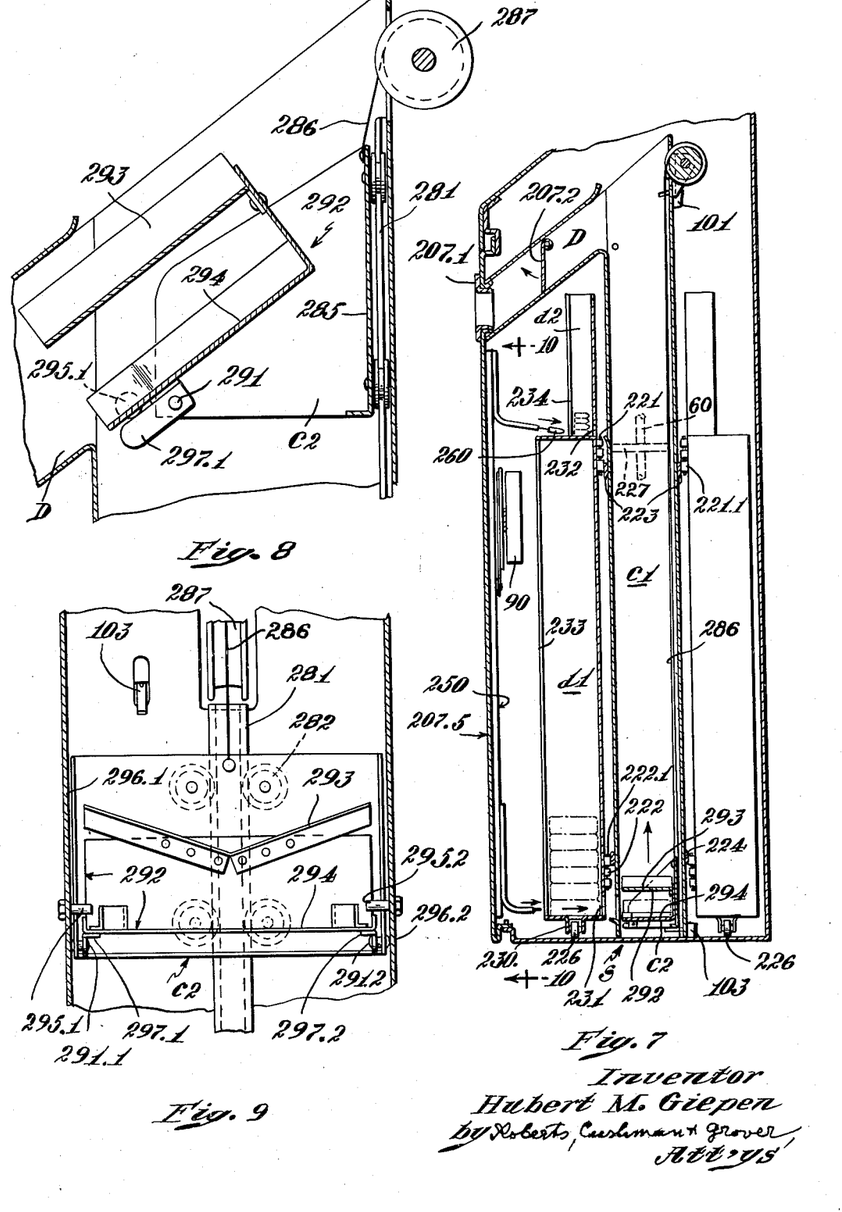
FIG. 7 is a partial section on lines 7—7 of FIG. 3.
FIG. 8 is a vertical section of the delivery chute according to FIG. 7 and of the elevator in discharging position.
FIG. 9 is a section showing the front elevator according to FIG. 8, in position prior to discharging.
Figures 10, 11:
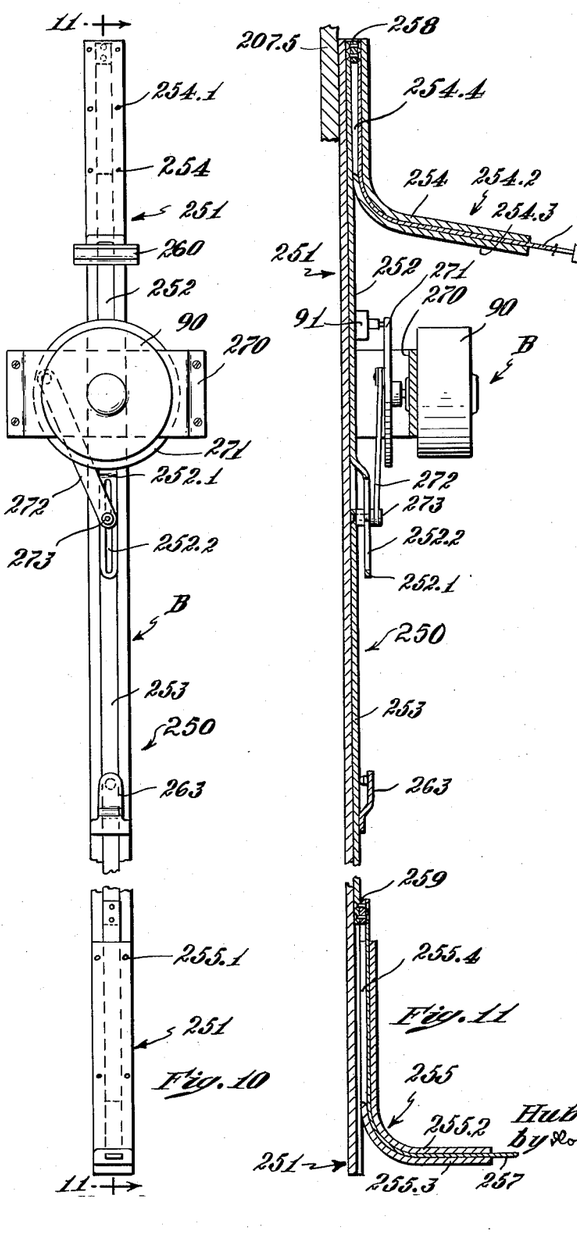
FIG. 10 is a rear elevation of the ejector device.
FIG. 11 is a section on lines 11—11 of FIG. 10.

The ejector drive unit 9 consists mainly of an ejector motor 90 which is also indicated in FIGS. 7, 10 and 11, and of a normally open control switch 91 which connects with the sequence control unit 7 in the manner, and for purposes which will be described hereinbelow.

The elevator control unit 10 has an elevator drive motor 100, and two elevator actuated position switches 101 and 103. Switch 103 is closed when the elevator reaches the lowermost position. In series with switch 101 is a normally closed time delay switch 102 which, as indicated in FIG. 2, may have a heat responsive bimetal element that closes after the current has flown through the heater coil 102.1 for a predetermined period of time.

The sold-out tester 11 comprises a normally de-energized actuating coil 111 which operates the mechanical linkage which will be described more in detail with reference to FIGS. 15 and 16 and which upon energization of coil 111 closes the normally open switch 112. These components are electrically connected with the sequence unit 7 and through it with any panel control unit 5 whose sold-out mechanism is supervised by the unit 11.

Figure 4:
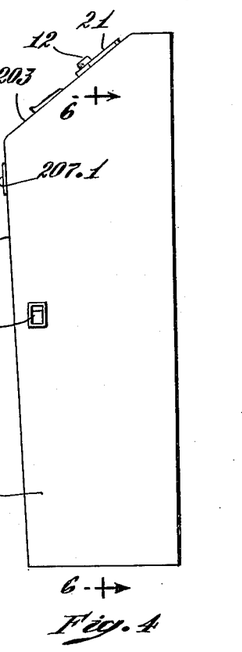
FIG. 4 is a side elevation corresponding to FIG. 3.

The return unit 12 consists of the above mentioned push button 12, also indicated in FIGS. 1, 3 and 4 which energizes the escrow unit coil 31.1 from a 30 v. source causing it to return coins which the customer elects to retrieve from the machine, and which energizes the reset coils 41.2 and 71 from the same source, resetting the counter unit 4 and the sequence unit 7 respectively.

The loading unit 13 has a push button 133 for energizing a coil 134 which thereuopn closes the normally open switch 135 and the switches 136, 137, 138 and 139 in order to advance the conveyor belt one step for each operation of the push button in order to bring consecutive bins to the station for purposes of reloading or inspection.

The power supply unit 14 has been mentioned above as providing voltages of desired rating for operating the various components of the machine in the most convenient manner. In the present embodiment, it is connected to the standard 110 volt supply line and consists of a transformer 14.1 with two secondaries, 14.21 being a secondary furnishing alternating current of 6 volts and secondary 14.22 furnishing alternating current of 30 volts. It will be understood that these voltages as well as the manner of providing them is wholly optional and that for example direct current can be used or current of one of the same voltage throughout.

*The mechanical components*

While it was possible to describe certain mechanical features of the invention with reference to the schematical FIGS. 1 and 2, other mechanical aspects of the invention require more detailed description as follows.

Figure 5:
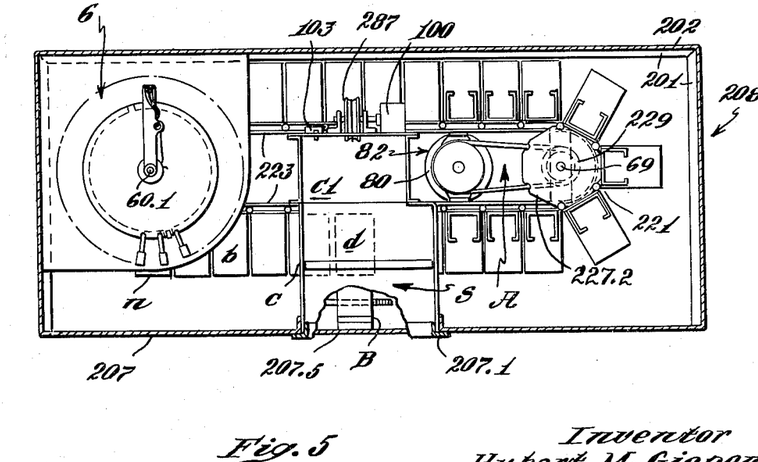
FIG. 5 is a section on lines 5—5 of FIG. 3.

The housing for the device as a whole also serves as a mounting frame for the conveyor unit with its storage bins, and as a support of the other components of the apparatus, as shown in FIGS. 3 to 7. In FIG. 5, a framework of angle irons 201 is shown as covered with sheet metal panels 202 in conventional manner, to form a housing of generally prismatic outline, but with an inclined front panel 203 (FIGS. 3 and 4) which serves to support the above described selector units 5a, 5b, 5c, etc., which will further be described with reference to FIGS. 13 and 14 but whose electrical construction was described above with reference to FIG. 2.

The control panel 203 supports further a coin slot and counter unit 205 on which are mounted the coin receiving slot 21, the counter window 25.1 which as described above is illuminated by the lamp 25 shown in unit 4 of FIG. 2, and the coin return push button 12.

The front panel 207 carries a package delivery frame 207.1 (FIGS. 3, 4 and 5) at the discharge end of the chute D (FIGS. 1, 7, 8 and 9). The side panel 208 has the above mentioned opening for the coin return E (FIGS. 3, 4, 6 and 20).

The conveyor unit proper will now be described with reference to FIGS. 5, 6 and 7. The individual bins a, b, c, . . . n, are at two upper and two lower edge regions, hinged to the adjacent bins, as indicated at 221 and 222 for the left-hand bin of FIG. 7. As clearly shown in FIG. 7 each hinge has pivoted on its pintle a nylon roller 221.1, 222.1 respectively. These nylon rollers contact metal guide straps 223, 224 which are mounted within the frame as clearly indicated in FIG. 6 and have straight portions between semi-circular end portions, as shown in FIG. 5. For supporting its weight, each bin has fastened to its bottom a roller 226, as shown in FIGS. 6 and 7. As shown in FIGS. 5 and 6, the hinges are engaged by semi-circular recesses of four sprockets, two at each end, indicated at 227.1, 227.2, 227.3 and 227.4 in FIGS. 5 and 6. Each pair of sprockets is fastened to a shaft 60, 69 respectively. One of these shafts, for example 60, is carried beyond its upper sprocket 227.1 and carries at the end of the extended shaft the above described gear 67 for the disk 62 of the route selector unit 6 as described above with reference to FIGS. 2 and 19. FIGS. 5 and 6 indicate this arrangement. One of the shafts, for instance 69 carries a pulley 229 for a conventional V-belt drive from the conveyor drive motor 80 mentioned above with reference to FIGS. 1 and 2. FIGS. 5 and 6 show this motor and also its brake 82.

Each bin can have several stories, such as the stories $d1$ to $d3$ indicated in FIG. 1. Each bin story has at its inner side, just above the bottom a discharge opening, indicated at 231 and 232 of FIGS. 6 and 7, for the goods which are stored in the bins. The bins are slotted on the opposite sides throughout their length for purposes of loading or emptying as well as for admitting, at the lower ends of these slots, the pushers of the ejector device which will be described below with reference to FIGS. 10, 11 and 12. These slots are indicated at 233 and 234 of FIGS. 6 and 7.

It will now be evident that, with the rollers 226 resting on the bottom sheet of the housing, with the nylon rollers 221.1 and 222.1 contacting guide strips 223 and 224, with the recesses of sprockets 227 engaging the hinges 221 and 222, and with the distance of the sprocket recesses corresponding to the width of the bins, the latter are positively guided, and that the entire bin conveyor unit can be stopped at any desired point by approximately controlling the motor 80. It will be further apparent that the conveyor unit can be of considerable length, independently of the frame structure, since each bin has its individual support for taking its weight so that the frame structure is not used for that purpose.

The ejector device B will now be described with reference to FIGS. 1, 2, 5, 7, 8 and 10 to 12. The ejector unit 250, which is shown in detail in FIGS. 10 and 11, is fastened to the front wall panel 207.5 of the housing, as also shown in FIGS. 5 and 7, below the chute D.

The ejector device B has a straight guide channel 251 which is suitably fastened, such as by welding, to the rear of wall 207.5. In the channel slide are an upper slide strip 252 and a lower slide strip 253. The upper slide strip 252 is held within the channel by an upper pusher guide 254, and the lower slide piece 253 is held in similar manner by a lower pusher guide 255 and by the finger 263 which is fastened to the channel 251. The members 254 and 255 are screwed to the flanges of the channel 251 as shown at 254.1 and 255.1 of FIG. 10. The front parts of the pusher guides, shown at 254.2 and 255.2, lead along the entire length of the guides, whereas the inner portions 254.3 and 255.3 are broken away on the inside in order to clear, at 254.4 and 255.4, the connecting pieces 258, 259, described below. Within the channel 251 and the pusher guide 254 slides the pusher band 256 which may be of the nature of a steel measuring tape. This band 256 is fastened to the member 252 by means of the above mentioned connector 258 which, as shown in FIG. 11, is riveted to the band 256 as well as to the strip 252. In similar manner the lower band 257 is fastened to the strip 253 by means of a connector 259. At the ends of the pusher bands 256 and 257, can be mounted pusher heads as indicated at 260 of FIGS. 7, 10 and 11. The strip 252 has an elevated portion 252.1 with a slot 252.2.

The ejector motor 90, described above with reference to unit 9 of FIG. 2, is mounted on the front panel 207.5 by means of a bracket 270. Its shaft reaches through the bracket toward the housing panel and carries a crank disk 271 on which is eccentrically pivoted one end of a pitman 272 which is with its other end pivoted on a pin 273 that reaches through the slot 252.2 and is fastened to the slide strip 253.

It will now be evident that, upon rotation of the motor 90, the pitman 272 will first move the strip 253, and with it the pusher band 257, downwardly and outwardly from the position shown in FIGS. 10 and 11, with the upper slide 252 remaining at rest until the pin 273 reaches the end of slot 252.2, when the upper strip 252 is also moved downwardly, and with it the pusher band 256 outwardly. The pusher heads, such as 260 as shown in FIGS. 10 and 11 are dimensioned to fit within the slots 233 and 234 which are provided lengthwise of the bins as above described, and they are shaped in accordance with the nature of the goods which they are to eject.

Figure 12:
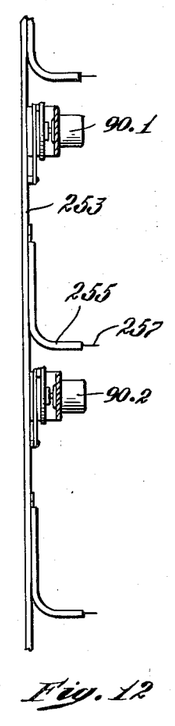
FIG. 12 is a diagram of a separately controllable multiple ejector, otherwise similar to that shown in FIGS. 10 and 11.

FIG. 12 shows an embodiment wherein each one of a series of stories of a bin has its own pusher and pusher drive in a manner which will now be easily understood, having in mind that the upper strip 252 with projection 252.1 is now omitted and each motor 90.1, 90.2 etc. drives a single pusher rod such as 253 with a pusher strip 257 within guide 255.

The elevator C is shown in FIGS. 5 to 9 as follows.

The elevator shaft C1 extends within the conveyor unit and is surrounded by the bins, as clearly shown in FIGS. 5, 6 and 7, each of which shows the complete elevator unit C with shaft C1 and bucket C2 as indicated in FIG. 1.

Guided within the elevator shaft C1, by means of a rail 281 and rolls 282 (FIGS. 7 to 9) is an elevator bucket C2 which is suspended on the cable 286 wound on a drum 287 that is coupled to the elevator motor 100 of unit 10 of FIGS. 1 and 2. The mechanical details of the elevator motor drive are not shown in detail because they are conventional. At the top of the elevator shaft is arranged the switch 101, and at the bottom is arranged the switch 103, both switches being described above with reference to unit 10 of FIG. 2.

Within the elevator bucket is a two level delivery bin 292 hinged to the bucket C2 with rivets 291 (FIGS. 8 and 9). For purposes of the present embodiment, the upper level of the discharge bin is in the form of a recessed chute 293, whereas the lower level is in the present instance flat, as indicated at 294.

As shown in FIG. 7, the head of the lower ejector band 257 pushes the package at the bottom of bin $d1$ into the flat bottomed lower level of the delivery bin 294, whereas after the time delay introduced as described above with reference to slot 252.2 and pin 273 of FIGS. 10 and 11, a package in the upper bin $d2$ is pushed through the opening 232, and is received by the chute-shaped upper level 293 of the discharge bin 292.

Two studs 295.1 and 295.2 are fastened to the walls 296.1 and 296.2 of the elevator shaft, as indicated in FIGS. 8 and 9. Two short pieces of angle iron 297.1 and 297.2 are welded to the bottom 294 of the discharge bin, and these are used for receiving the above mentioned hinge rivets 291. When the elevator bucket 285 reaches the top of its shaft, the pins 295 strike the angle pieces 297 and tip the delivery bin skip hoist fashion, as clearly indicated in FIG. 8, discharging both articles into the chute D.

A selector panel unit 5 is shown in detail in FIGS. 13 and 14 as follows. A selector control frame 301 is hinged to the inclined control panel 203 by means of a rubber grommet 302 which engages the baseplate 303 and is fastened thereto by means of a stud and nut 304. The frame 301 has a window 305 covered with a transparent plate 306 which carries on a transparent background the price of the article that can be purchased by operating this particular control unit. The plate 303 has an opening 307 through which the plate 306 is illuminated by one of the lamps 5.4 which are in the circuits described above with reference to units 5 of FIG. 2. A depending prong portion 303.1 of the plate 303 has an opening 308 for engaging the actuating toggle pin 309 of switch 5.51. Thus the prong 303.1 constitutes together with the frame 301 the push button 5.5 as shown in FIG. 2 for operating switch 5.51. The frame 301 conveniently carries at 301.1, a legend describing the article to be available by pushing this frame.

Figure 13:
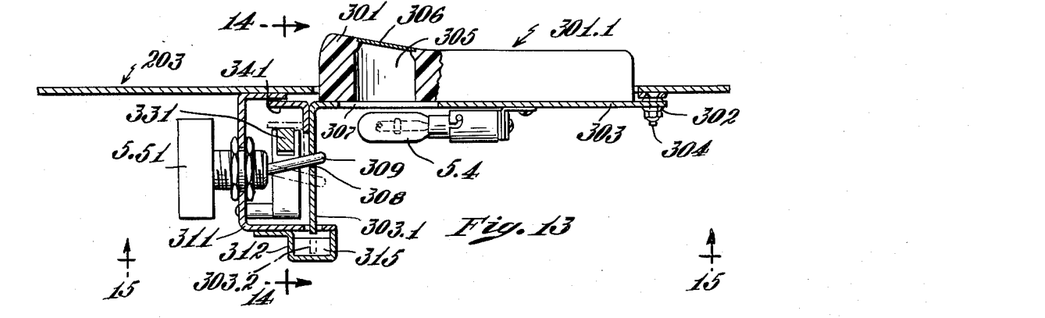
FIG. 13 is a cross section through the selector panel shown in FIG. 3, on lines 13—13 of FIG. 3.
Figures 14, 15, 16:
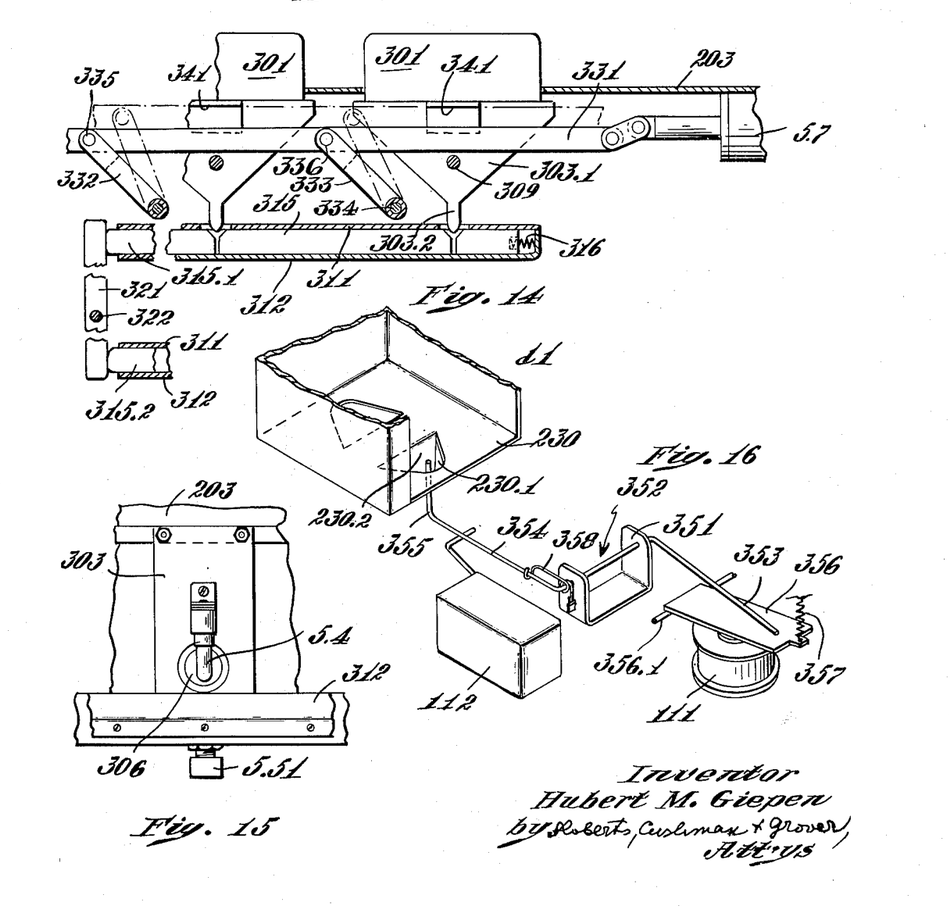
FIG. 14 is a section on lines 14—14 of FIG. 13.
FIG. 15 is a bottom view in direction at lines 15—15 of FIG. 13, of part of the selector panel shown in FIGS. 13 and 14.
FIG. 16 is an axonometric diagram showing the sold out testing device.

FIGS. 13 and 14 show an arrangement for preventing the simultaneous operation of two selector units, and for resetting the same after a sale has taken place. The sheet metal parts 311 and 312, fastened to panel 203, form a channel which receives blocks 315 which slide therein and are pressed against each other by a spring 316, leaving just enough room for receiving a single projection 303.2 of the depending prong 303.1 of the plate 303. The depressing of any one of the selector frames 301 of a row of selector panel frames thus tightly contacts the blocks 315 so that a second switch of the same row cannot be depressed. If several rows of selector frames are provided, such as for example two rows as indicated in FIGS. 1 and 3, these rows are coupled by an expedient shown at the left-hand side of FIG. 14, namely a lever 321, pivoted at 322 and transferring the movement of the last block 315.1 to the corresponding first block 315.2 of the second row, which of course slides in its channel such as formed by members 311 and 312.

After operation, the selector frame 301 remains depressed, until the sale is performed, there being no spring or similar means provided to move it back immediately upon release. At the completion of the cycle, the frame in question is reset by means of the resetting solenoid 5.7 described above with reference to FIG. 2, that operates in this embodiment a resetting rod 331 (FIGS. 13, 14) which is suspended on links 332, 333, the link 333 being pivoted at 334 on the frame whereas the pivots 335 and 336 are floating. Upon the rod 331 being moved toward the right-hand side of FIG. 14 by the solenoid 5.7, it also moves upwardly and lifts the plate 303 by way of the lip 341 (FIG. 13) which is fastened to the dependent tongue 303.1. After the selector panel frame has been reset, the rod 333 moves again towards the left of FIG. 14, into the position shown in FIG. 13, which present this mechanism in normal position, the dot-and-dash lines indicating the position of lip 341 just after the frame has been depressed but before it has been reset.

The sold-out tester unit 11 will now be described with reference to FIG. 16. This figure shows the solenoid 111 and the switch 112 which are described above with reference to FIG. 2. The bottom 230 of a bin such as d1 of FIG. 1 which is at the discharge stations, has an opening 230.1 which is formed by one of downwardly bent cut-outs 230.2 which support the rollers 226, as shown in FIGS. 6 and 7. Mounted on the bottom of the housing of the device, below the conveyor, is a bracket 351 on which is pivoted a feeler lever 352 having a solenoid arm 353 and a feeler arm 354 carrying a feeler rod 355. The solenoid 111 is normally de-energized and the armature 356 swung upwardly on its pivot 356.1, by the pull of spring 357. The arm 353 lies loosely on the armature 356, is swung upwardly, and the arm 354 downwardly, against the force of spring 358. The feeler rod 355 is then below the surface of bin bottom 230. Upon energization of the solenoid 111, the spring 358 is permitted to move the feeler 355 through the opening 230.1 into the bin. If the bin is empty, the lever 354 can swing accordingly and arm 354 will close the normally open switch 112. If the bin contains goods, the feeler 355 cannot penetrate thereinto although the armature 356 may be lowered, and the switch 112 remains open.

The escrow unit 3 remains to be described with reference to FIGS. 20 to 25.

As indicated in FIG. 6, this unit is mounted on the side wall 208 of the housing, by means of a bracket 401. The coin separator unit is indicated at 2 of FIGS. 21 and 22 as discharging into the escrow chute 402. An escrow tray 405 with a front rim 405.1 and open sides 405.2 and 405.3 is mounted on the bracket 401 as follows. A cash operator link 411 is hinged at 412 to the stationary bracket 401. The link 411 is also hinged, at 415, to a projection 405.5 of the tray 405. A cash coin operator link 421 is at 422 hinged to the stationary bracket 401.

Figure 24:
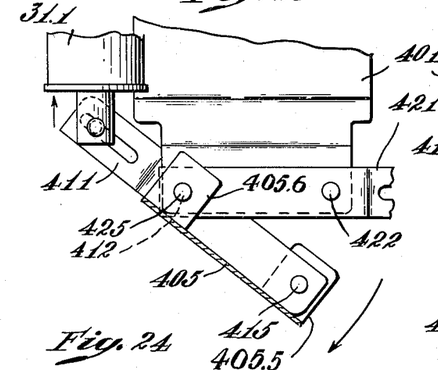
FIGS. 24 and 25 are details of the escrow unit bottom portion, showing the said unit in coin return and coin retaining positions respectively.
Figure 25:
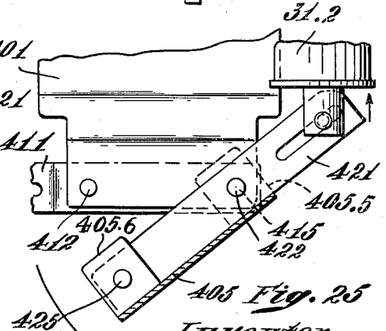

The link 421 is further hinged, at 425, to a second projection 405.6 of the tray 405. The solenoid 31.1 is connected to the arm 411 by means of the pin and slot 411.1, and the solenoid 31.2 is similarly connected to the link 421 by means of pin and slot 421.1. As shown in FIG. 24, if solenoid 31.1 is energized and the link 411 rotated in the direction of the arrow, the tray 405 is swung on pivots 412 and 425 and permits the coins to slide from the chute 402 into the distribution chute 402.1 and from there into the coin return opening E. Similarly, if the solenoid 31.2 is energized, the tray 405 swings with the link 421 on pivots 415 and 422 and discharges the coins into the distribution chute 402.2 and into cash box F. The solenoids 31.1 and 31.2 and their locations within the control circuit are described above with reference to FIG. 2.

The operation

The device according to the invention performs the sale of a selected article, at an indicated price, by depositing any coins of any desired denomination, indicates at all times the amount of money paid in and the fact that a selected article is or is not sold out, and permits, in the latter case, retrieval of the amount that has been paid in. It also prevents any sale the full price of which has not been deposited, which amount can be retrieved also in that instance.

The coins are inserted into slot 21 of the coin slot and reject unit 1 of FIGS. 1 and 2 wherein it passes a conventional slug rejection device with the normally closed cut-off coil 22 that is energized, cutting off the slug rejector, as soon as the switch 75 of sequence unit 7 is opened, that is when the device has ascertained, in the manner which will appear hereinbelow, that the price of the selected article has been paid in good coin.

The coin then passes into the coin separator unit 2 which, as described above, has a number of switches connected in parallel and so arranged that one switch closes when a certain coin (such as a five cent piece) passes, that two switches are consecutively closed when a different coin, (such as a ten cent piece) passes, and that five switches close consecutively when still another coin (such as a quarter) passes the unit 2.

The coin or coins then enter the escrow unit 3 where they are stored on the tray 405 until further disposed of, either into the return slot E (FIGS. 1, 3, 4 and 20) or into the cash box F (FIGS. 1, 3, 4, 6 and 20), as will be explained below.

The energy impulses originating in the coin separator switches 25.1 to 25.5 of unit 2 actuate the stepper magnet 41.1 of unit 4 as follows. The first energy impulse whether originating from the insertion of a five cent piece or from the first switch closure caused by the insertion of a ten cent or twenty-five cent piece, makes contact between 43.0 and 45 of the counter switch as shown in block 4 of FIG. 2. The first step also closes the switch 48 by means of the pin 47. This switch controls the counter lamp 25 and closes the circuit reading to switches 5.31 of the units 5. Switches 5.31, if closed in a previous vending cycle, connect the sold-out lamps 5.4, in case the particular article is sold-out as indicated by the sold-out unit 11 in the manner to be described below. Also upon the first energy impulse, the stepper contact 43.1 reaches contact 44 thus energizing the reset coil 5.7 for the selector panel units, which, by withdrawing the pawl 5.6 shown in FIG. 2, or by means of the mechanism described above with reference to FIGS. 13 and 14, clears the selector switches 5.51. All the push button frames 301 (FIG. 13), represented in FIG. 2, by the push buttons 5.5 are now released and ready for operation.

The disk 42 of counter unit 4 now continues to rotate stepwise so long as coins are inserted into slot 21. Assuming by way of example that the purchaser intends to buy an article for twenty-five cents, he can insert five nickels, or two dimes and one nickel or one quarter; each combination will send five energy impulses from unit 2 into unit 4. Thus, after five steps the contact 43.1 reaches the contact 46.1. At the same time the number "25" appears in the counter window 25.1 shown in FIG. 3. The numbers for example opaque on a transparent background attached to disk 42, will appear between the lamp 25 and the window 25.1. Is should be noted that the contact 43.4 leaves the contact 44 when contact 43.1 reaches contact 46.1.

Thus after five steps initiated by the payment of twenty-five cents in any one combination of three types of coins, this amount is indicated at 25.1, all selector frames are released and the wire 46a leading to contact 46.1 is energized from the 30 volt source, through segment 45 and contact 43. Also, contact 44 is now open.

It will be evident that this device can be built to accommodate fairly large amounts if a sufficient number of contacts 43 and 46 are provided for unit 4, so that continued paying-in of coins, and further advancing of the stepper switch of unit 4, energizes wires additionally to 46.2, 46.3, etc., in which case units 5 would be provided which require the payment of correspondingly higher prices. It will be further evident that various modes of payment can be adopted, for example including the payment of half dollar or dollar pieces.

The purchaser, observing at window 25.1 that the appropriate amount has been registered, can now proceed to operate the selector frame that is marked with the desired article. Assuming by way of example that twenty-five cents have been paid in and that the purchaser wants an article from the bin which corresponds to unit 5a, the frame 301 of unit 5a can be depressed thus closing switch 5.51 of unit 5a.

Assuming that the article controlled by the panel unit 5a is not sold-out so that the solenoid 5.3 is de-energized with switch 112 of unit 11 open, switch 5.31 open, and switch 5.32 closed as shown at 5a of FIG. 2, closing the switch 5.51 and establishes a circuit from the 30 volt source, segment 45—contact 43.1—contact 46.1—wire 46a—contact 5.51—contact 5.32—route selector contact 63.12—segment 62.2—slip ring 65.2—wire 66.2—solenoid 86—back to the 30 volt source. If that panel unit bin had been sold out in the previous sale from that bin, the solenoid 5.3 would have been energized in said prior vending cycle, as explained below, so that switch 5.31 would be closed and switch 5.32 would be open. Therefore lamp 5.4 of that unit would light upon closing of the switch 48 following the first step of counter unit 4, indicating that that bin had been sold out. Since the switch 5.32 would be open, the push-button 5.5 of the sold-out bin could not close a circuit to begin a vending cycle.

As described above, the route selector disk 62 is geared to the conveyor structure in such a manner that the contact pad 63 that is connected to that selector panel unit 5 which corresponds to and selects a certain bin, is located at the pad 62.3 when the bin is at the station S. Hence, the contacts 63 of that half of the total number of bins which is on one side of the bin at the station is on segment 62.1, and the contacts 63 of the remaining bins is on segment 62.2. Keeping in mind that the contacts 63 of the previously selected bin are always on pad 62.3, the next selected bin has its contact 63 either on 62.1 or 62.2, and if the conveyor drive motor 80 is thereupon so energized that the bin conveyor moves in one direction if the selected bin contacts 63 are on 62.1 and in another direction if they are on 62.2, the selected bin will move into its station position (when its contacts 63 are on the pad 62.3) in the shorter of the two possible routes.

For purposes of the present explanation it may be assumed that the preceding sale was made from bin b which is controlled from selector panel unit 5b which then has the corresponding contact 63.2 on the pad 62.3 of the route selector unit 6. If now the member 5.5 of panel 5a, corresponding to bin a, is depressed closing switch 5.51, as described above, and if in the above traced circuit, the motor 80 is energized to drive the conveyor unit in the direction which will bring contact 63.1 onto pad 63.3, the newly selected bin a will proceed to the station via the shorter route. By comparison, if the contact 63.32 of bin c is on segment 62.1 as shown in FIG. 2, the contact 63.31 bearing on the insulating disk 62 (not shown in FIG. 2), and the selector panel frame of unit 5c (corresponding to contacts 63.3) is depressed, the motor 80 will be energized to drive the conveyor unit in opposite direction, such as to bring the bin c via the shorter route towards the station with the contact 63.3 on pad 62.3.

Coming now back to the above traced circuit including the contact 63.12 and the slip ring 65.2, it will be remembered that this circuit energizes the solenoid 86, closing switches 86.1, 86.2, and 86.3. This setting first of all energizes the brake solenoid 81 which was deenergized in circuit 110 v.—81—86.3—110 v. Hence, switch 86.3 closing energizes solenoid 81 and sets the motor free to move in the circuit closed by switch 86.1 for the armature 83 and by switch 86.2 for the field winding 84.

It will be noted that any contact such as 63.32 in FIG. 2 that rests on segment 62.1 is through that segment connected to slip ring 65.1 and hence through wires 66.1 to solenoid 85 which when energized closes switches 85.1, 85.2, and 85.3. This, as can easily be traced in the circuit for unit 8, reverses the current flow direction in the field 84 while retaining that in armature 83, thus causing the motor to run in opposite direction.

As will be explained again in sequence, that one of the two motor actuating coils 85 and 86 which is energized during the operation of the conveyor motor 80 remains energized until both route selector contacts 63 reach the pad 62.3 on the rotating disk 62, when the motor actuating solenoid 85 or 86 is cut off. The pad 62.3 sends an impulse to the setting coil 72 of stepper unit 7, and 73 performs one step. Also, contact 63.31 on pad 62.3 is connected to and is adapted to energize the solenoid 5.3 of unit 5, for closing switch 5.31 and opening switch 5.32 when the particular goods are sold out in a manner soon to be explained. It will be noted that both contacts 63.11 and 63.12 are now and remain on pad 62.3 until the conveyor unit is again set into motion for the next sales transaction.

It will be further noted that, due to the above described construction of the selector panel units, explained with reference to FIGS. 13 to 15, only one selector panel frame 301 (corresponding to push-button 5.5 of FIG. 2) can be depressed at one time and that one depressed, will be kept in this position by means of this mechanism until the resetting coil 5.7 is energized.

As mentioned above, the coil 72 advances the sequence switch upon receiving an impulse, such that it will advance the rotor 73 one step after the motor control relay 85 or 86 has been deenergized and has opened the relay switches. The moving contact 73.1 of unit 7 is now on contact 73.12 and contact 73.2 is on contact 73.22. The connections at contact 73.1, 73.12 and 73.2, 73.22 energize the ejector motor 90 in the 30 volt power supply. Double break contacts are preferably used for purposes of safety and certainty of operation.

The ejector motor 90 now moves by means of pitman 272 (FIGS. 10 and 11) the slide 253 and with it the flexible ejector band 257. The head of the band enters the slot 233 (FIG. 7) and pushes the article through the bin opening 231 as indicated by the arrows of FIG. 7, out onto the bottom level 294 of the discharge bin 292. The pin 273 (FIGS. 10 and 11) then reaches the lower end of slot 252.2, and the head 260 of band 256, connected at 258 to the slide 252 with the slot 252.2, pushes the object into the upper level 293 of the discharge bin 292. It will be evident that the delivery can be so timed by means of pitman 272 and slot 252.2 that objects can be discharged on top of each other even if only a single level discharge bin is provided.

When the ejector mechanism reaches the end of the ejecting cycle, it closes and sends an impulse through switch 91 thus energizing coil 72 of unit 7, which moves the rotary contacts of 73 one step further on to contacts 73.13 and 73.23. In this position, these contacts energize the elevator motor 100 from the 30 volt terminals of the power unit 14. The elevator lifts the merchandise until in its uppermost position, the elevator cage closes the switch 101 (FIGS. 2, 6, 7) which is normally open. This energizes the time delay unit which is in series therewith, for example the heating resistor 102.1 which opens the bimetal contact 102 after a predetermined time. Thus 101 first energizes and then 102 de-energizes the stepping coil 72 which thereupon advances the rotating element of 73 to the next contact points 73.14 and 73.24.

Through contact 73.14, the solenoid 111 of sold-out unit 11 is energized and lifts the finger 355 as described above with reference to FIG. 16. If the bin in question should be empty, the finger can enter the opening 230.2, and the mechanism according to FIG. 16 closes the switch 112 and energizes the sold-out relay 5.3 of the selector panel units 5. These sold-out relays in turn close the sold-out contact 5.31 and open the selector contact 5.32. It will be noted that the coil 5.3 is energized through the route selector contacts 63.1 of the bin in question which are now on the pad 62.3 so that only the sold-out solenoid 5.3 of the selector panel unit will be energized. The sold-out lamp 5.4 can now be energized to illuminate the sold-out window 306 of the respective selector panel unit on each subsequent operation of the vending apparatus. The opening of switch 5.32 prevents further operation of the vending apparatus in subsequent attempted purchases from that sold-out bin.

During the time delay between the closing of switch 101 and the opening of switch 102 of unit 10, the goods have been discharged by way of the discharge bin 292 being tilted forwardly on pivots 291 as described with reference to FIGS. 7 to 9. The goods slide from levels 293 and 294 into the chute D, and can be removed from the opening 297.1 shown in FIGS. 3, 4 and 7. The flap 207.2 (FIG. 7) permits sliding down of the goods but prevents access to the interior of the apparatus.

The elevator now descends, with the motor rotor idling until it strikes the switch 103 which sends an impulse to the resetting coil 71 of sequence unit 7 and also sends an impulse to the resetting coil 41.2 of counter unit 4. Both stepping switches are thus returned to normal position.

It will be remembered that the first energization of the coil 72 was made through the time delay relay 66.32 which maintained a closed circuit through the coil 72 for a short period of time. Said relay 66.32 also energizes the cash box coil 31.2 for the same period of time. Energization of coil 31.2 operates the escrow mechanism as described above with reference to FIGS. 21 to 25, and discharges the coin or coins into the cash box F (FIGS. 6 and 20).

If an article is sold out, and this has been detected after the previous sale of said article, as above described by means of the sold-out unit 11 which lights up the signal lamp 5.4 of the selector panel unit in question, the money which has been paid in can be recovered by pressing the return button 12 which energizes the coin return coil 31.1 delivering the coin into the return slot E, shown in FIGS. 3, 4 and 20. The cash return switch 12 also energizes the resetting coils 41.2 of unit 4 and 71 of unit 7, respectively, performing in this instance the function of the elevator bottom switch 103 as above described.

If it should happen that the same article is sold in two consecutive sales, that is if the same selector panel unit frame is pressed directly following the operation of that particular panel unit, the contacts 63 of this unit remain on the pad 62.3 and current flows through the slip ring 65.3 and the brush 66.3 to the time delay device 66.32 of route selector unit 6. This time delay device 66.32 maintains during a suitable period, current flowing to the resetting coil 72 of sequence unit 7 and to the cash box solenoid 31.2 of escrow unit 3. When this current is interrupted by the time delay device 66.32 opening its switch, the sequence unit stepper coil 72 is de-energized. It will be remembered that 72 had been energized from time delay 66.32 through the switch 73.3 which, with stepper rotor 7 in normal position, is closed so that when 72 is again de-energized by the opening of the switch of 66.32, the stepper moves to the second position 73.12, 73.22, and from there on the cycle proceeds as above described.

The contacts 73.15 and 73.25 are insulating contacts which isolate the time delay relay 66.32 in order to prevent repeat performance.

It will now be evident that after performance of any one of the above described cycles, the device according to the invention is completely reset and ready for the next cycle of operation to carry out another sale.

It should be understood that the present disclosure is for the purpose of illustration only and that this invention includes all modifications and equivalents which fall within the scope of the appended claims.

I claim:

1. A device for automatically selling a variety of differently priced articles from a series of bins each of which can be conveyed to a station for discharge and delivery of an article upon insertion of at least the price of an article in any combination of coins and upon manual indication of a selected article selling not higher than the price inserted, comprising: motor means for conveying any bin to said station; motor means for discharging at said station an article from said bin; motor means for delivering the article from the station; means for separating the inserted coins and for initiating electric control impulses one for each multiple of the lowest coin value; means for counting said control impulses, including selector conduit means one for each value of a series of multiple values of said lowest coin value, and means for energizing each selector conduit means that corresponds to an inserted coin value at which an article is sold; a plurality of selector means one for each article sold, each connected to that one of said selector unit conduit means that corresponds to the price of its article, and each including motor conduit means, and manually actuated selector switch means for energizing its motor conduit means through its selector conduit means, said control impulse counting means also including means for clearing said selector means prior to energizing said selector conduit means; and means energized by said motor conduit means for consecutively activating, upon actuation of one of said selector switch means, said conveying, said discharging and said delivering motor means to bring the bin holding the selected article to the station and there to discharge and to deliver it.

2. A device for automatically selling a variety of differently priced articles from a series of bins each of which can be conveyed to a station for discharge and delivery of an article upon insertion of at least the price of an article in any combination of coins and upon manual indication of a selected article selling not higher than the price inserted, comprising: motor means for conveying any bin to said station; motor means for discharging at said station an article from said bin; motor means for delivering the article from the station; means for separating the inserted coins and for initiating electric control impulses one for each multiple of the lowest coin value; means for counting said control impulses, including selector conduit means one for each value of a series of multiple values of said lowest coin value, and means for energizing each selector conduit means that corresponds to an inserted coin value at which an article is sold; a plurality of selector means one for each article sold, each connected to that one of said selector unit conduit means that corresponds to the price of its article, and each including motor conduit means, manually actuated selector switch means for energizing its motor conduit means through its selector conduit means, means for holding said selector switch means closed upon manual actuation thereof, and means for releasing said holding means prior to said impulse counting; and means energized by said motor conduit means for consecutively activating, upon actuation of one of said selector switch means, said conveying, said discharging and said delivering motor means to bring the bin holding the selected article to the station and there to discharge and to deliver it.

References Cited in the file of this patent

UNITED STATES PATENTS

| Number | Name | Date |
|---|---|---|
| 420,788 | Hart | Feb. 4, 1890 |
| 1,644,371 | Goldman | Oct. 4, 1927 |
| 1,842,243 | Boyer | Jan. 19, 1932 |
| 1,889,318 | Larsen | Nov. 29, 1932 |
| 1,905,229 | James | Apr. 25, 1933 |
| 1,940,103 | Rosen | Dec. 19, 1933 |
| 2,072,796 | Christopher | Mar. 2, 1937 |
| 2,093,410 | Boon | Sept. 21, 1937 |
| 2,121,970 | Landreth | June 28, 1938 |
| 2,236,688 | Kuhl | Apr. 1, 1941 |
| 2,253,863 | Melick | Aug. 26, 1941 |
| 2,279,936 | Brodie | Apr. 14, 1942 |
| 2,330,186 | Jetseck | Sept. 21, 1943 |
| 2,497,748 | Von Stoeser | Feb. 14, 1950 |
| 2,536,412 | Bamford | Jan. 2, 1951 |
| 2,589,099 | Larkin | Mar. 11, 1952 |
| 2,607,463 | Saigh | Aug. 19, 1952 |
| 2,633,958 | Childers | Apr. 17, 1953 |
| 2,643,169 | Wells | June 23, 1953 |
| 2,656,029 | Spero et al. | Oct. 20, 1953 |
| 2,778,504 | Byrne | Jan. 22, 1957 |
| 2,834,512 | Fry | May 13, 1958 |
| 2,875,877 | Hoban | Mar. 3, 1959 |